United States Patent [19]

Edenhofer

[11] E Re. 28,529

[45] Reissued Aug. 26, 1975

[54] HEARTBEAT MONITOR WITH AUDIO AND VISUAL OUTPUTS

[75] Inventor: Harry J. Edenhofer, Southampton, Pa.

[73] Assignee: Survival Technology, Inc., Bethesda, Md.

[22] Filed: Oct. 16, 1973

[21] Appl. No.: 406,890

Related U.S. Patent Documents

Reissue of:

[64] Patent No.: 3,613,670
Issued: Oct. 19, 1971
Appl. No.: 798,676
Filed: Feb. 12, 1969

[52] U.S. Cl. ..... 128/2.06 F
[51] Int. Cl. ..... A61b 5/04
[58] Field of Search ..... 128/2.05 R, 2.06 A, 2.06 F, 128/2.06 R, 2.05 T

[56] References Cited

UNITED STATES PATENTS

| | | | |
|---|---|---|---|
| 2,492,617 | 12/1949 | Boland et al. | 128/2.06 |
| 2,927,573 | 3/1960 | Roepke et al. | 128/2.05 T |
| 3,138,151 | 6/1964 | Chapman et al. | 128/2.05 |
| 3,144,018 | 8/1964 | Head | 128/2.06 X |
| 3,144,019 | 8/1964 | Haber | 128/2.06 A |
| 3,316,897 | 9/1967 | Weidinger et al. | 128/2.06 |
| 3,426,150 | 2/1969 | Tygart | 128/2.06 R |
| 3,599,628 | 8/1971 | Abbenante et al. | 128/2.06 F |

OTHER PUBLICATIONS

Bastir, German allowed application No. 1,264,680, Mar. 28, 1968, 5 drawings, 5 pages-spec. (128/2.06)

*Primary Examiner*—William E. Kamm
*Attorney, Agent, or Firm*—Cushman, Darby & Cushman

[57] ABSTRACT

A pocket size, self-contained cardiac monitor for on-patient or central station monitoring by visible and/or audible signals related to the beat of a patient's heart, the monitor having the features of: using its own circuitry for calibration; having a time delay to mask out spurious signals; and having circuit means to drive a monitor lamp and speaker with a minimum of power.

4 Claims, 4 Drawing Figures

INVENTOR.
Harry J. Edenhofer

BY

Frederick J. Olsson
ATTORNEY.

INVENTOR.
Harry J. Edenhofer

BY

Frederick J. Olsson
ATTORNEY.

HEARTBEAT MONITOR WITH AUDIO AND VISUAL OUTPUTS

Matter enclosed in heavy brackets [ ] appears in the original patent but forms no part of this reissue specification; matter printed in italics indicates the additions made by reissue.

---

*This is a reissue application based on U.S. Pat. No. 3,613,670 issued Oct. 19, 1971.*

This invention relates to medical equipment and in particular relates to a device serving as a cardiac monitor by producing audible and/or visible signals which are related to the heart rate of a person's heart, the audible signals being in the form of beeps from a speaker and the visual signals being flashes of light from a lamp.

One of the objects of the invention is to provide a design for a cardiac monitor which permits either on-patient or central station type of monitoring, for the latter type the monitor unit being directly connectable to the room call system for activating the alarms or indicators at the nurses' central station.

A further object of the invention is to provide a cardiac monitor having audible and/or visible signals activated in an alarm mode, in the alarm mode the signals being activated in a low range when the heart rate is below a selected rate setting and in a high range when the heart rate exceeds a selected rate setting.

Another object of the invention is to provide a cardiac monitor of the kind in question having circuitry arranged so that spurious signals do not activate the audio visual indicators and thereby prevent false alarms.

Another object of the invention is to provide a cardiac monitor having audible and/or visible signals activated in an alarm mode or in a pulse mode. In the latter mode the signals being activated directly in accordance with the heart rate.

Another object of the invention is to provide in a cardiac monitor of the kind in question circuitry wherein the heart rate set points can be checked for accuracy simply by use of the circuitry itself and thereby obviate the necessity for additional test equipment.

Another object of the invention is to provide in a cardiac monitor of the kind in question an audio-visual signal generator having a minimum number of circuit components and which draws for operation only approximately 2 milliamperes from an 8.4-volt battery.

With the above in mind the invention will be explained below in connection with the following drawings wherein:

*FIGS. 2–2b are* a diagrammatic view partially in block form and partially in circuit form showing various of the electrical components of the invention.

At the outset it is pointed out that the invention contemplates the use of standard conventional electrical components such as transistors, capacitors, resistors, diodes and the like. These various components are arranged and correlated with respect to one another in a unique manner so as to perform certain functions for carrying out the desired monitoring operation.

Figure 1:
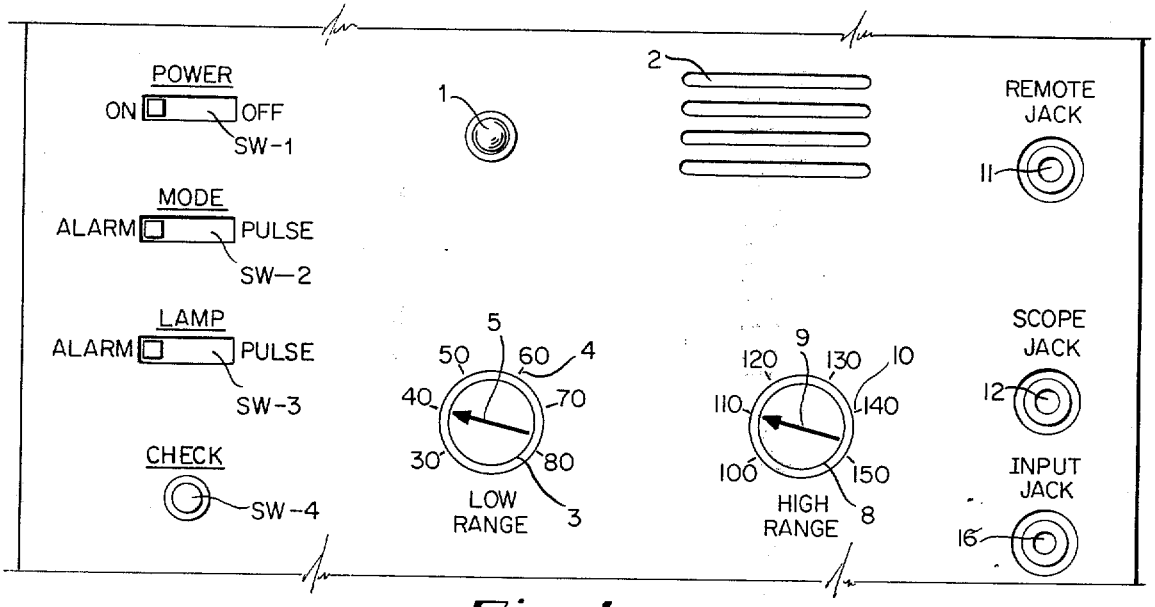
FIG. 1 is a diagrammatic view representing various switches and control knobs which may be on a face panel of an instrument constructed in accordance with the invention.

Referring to FIG. 1 the panel illustrates a monitor adapted for maximum functions as may be required as for example by a patient under intensive care.

The invention contemplates that the device be battery operated and that the battery be contained within the housing of the unit. This is of advantage in that the unit electrically floats so to speak and disturbances created from AC sources or other peripheral equipment are eliminated. The power switch SW–1 connects or disconnects the battery with the circuit.

Below the power switch is the mode switch SW–2 which conditions the unit for operation in either the alarm mode or to the pulse mode. The lamp switch SW–3 provides for use of the lamp either in alarm mode or in pulse mode. The lamp which is indicated at 1 flashes at a period corresponding to the beat of the patient's heart. To the right of the alarm light 1, I have indicated several slots 2. These provide openings for a speaker disposed inside of the unit which, of course, provides the audible signals.

The panel has a rotatable control knob 3 associated with a scale 4. The knob 3 has an arrow 5 which indicates the rotational position of the knob on the scale 4. Adjacent the knob 3 there is a similar knob 8 with an arrow 9 which is used in association with the scale 10.

The knob 3 is used for low-range monitoring. When the arrow 5 points, say to the numeral 40 on the scale, the unit will give visible and audible signals as long as the patient's heart rate is below 40 beats per minute. After this rate of 40 beats per minute, the audible-visible signal will cut off and will remain off until the heart rate reaches an upper limit.

The knob 8 is used for the high range monitoring. When the knob is set so that the arrow 9 corresponds to, say the number 120, the unit will begin to give audible and visible signals when the patient's heart rate is greater than 120 beats per minute.

The signals as between the low and high ranges are distinquishable by the difference in rate of occurrence and by that in the low-rate condition each signal is somewhat drawn out.

The switches SW–4 and SW–2 are used in the process of checking accuracy of the rate setting in the low and in the high range.

Also, in FIG. 1, I have indicated a remote jack 11 and a scope jack 12. The remote jack is for use in integrating the unit into central station type of monitoring. For example, by a jack from the unit to the call system so that an alarm signal is fed to the central station. The purpose of the scope jack is that the EKG signal from the patient can be put on a oscilloscope for display.

As will be apparent to those skilled in the art as the description proceeds, the theory of operation of the device is in comparing two electrical quantities or signals and then initiating a resultant signal when the comparison indicates that certain conditions are present as between the two quantities. The device develops a quantity in the form of a square wave signal, the total period or interval of which is a function of the time constant of the circuit which develops the signal and also the heart rate of the patient. The circuitry also develops another quantity in the form of a square wave signal, the duration of which is a function of some desired (settable) heart rate limit and of the heart rate of the patient. These two quantities are compared as to their "on" and "off" indications and when the actual heart rate of the patient is less or more than the set rate limit, a signal is developed which indicates the condition, i.e., that the heart rate is less or greater than the set-in rate limit (by knob 3 or knob 8).

Figure 2A:
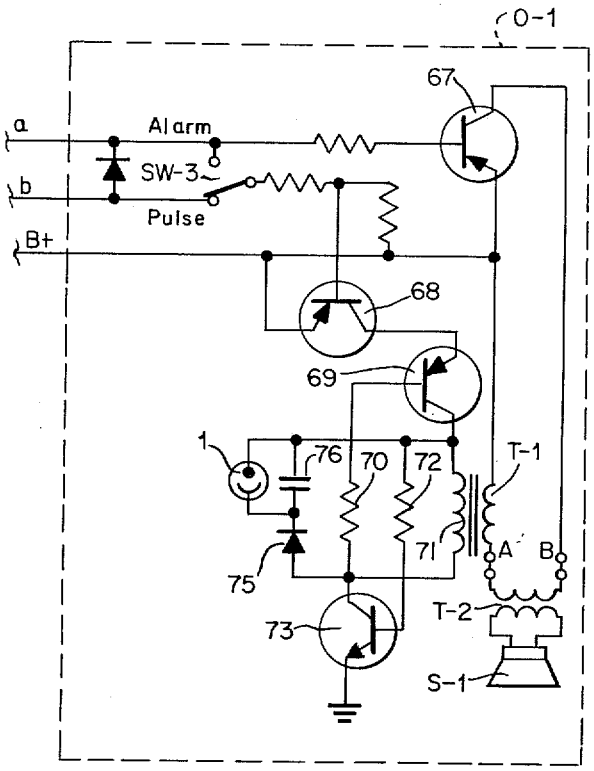
Figure 2B:
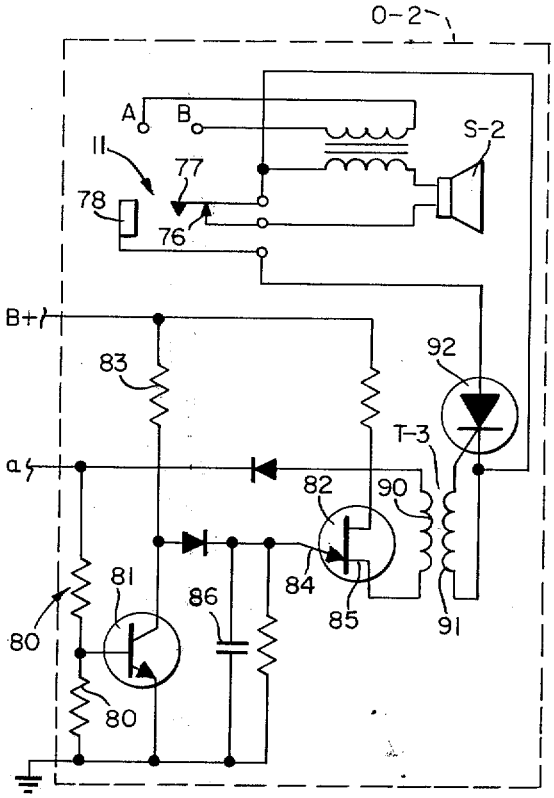
Figure 2:
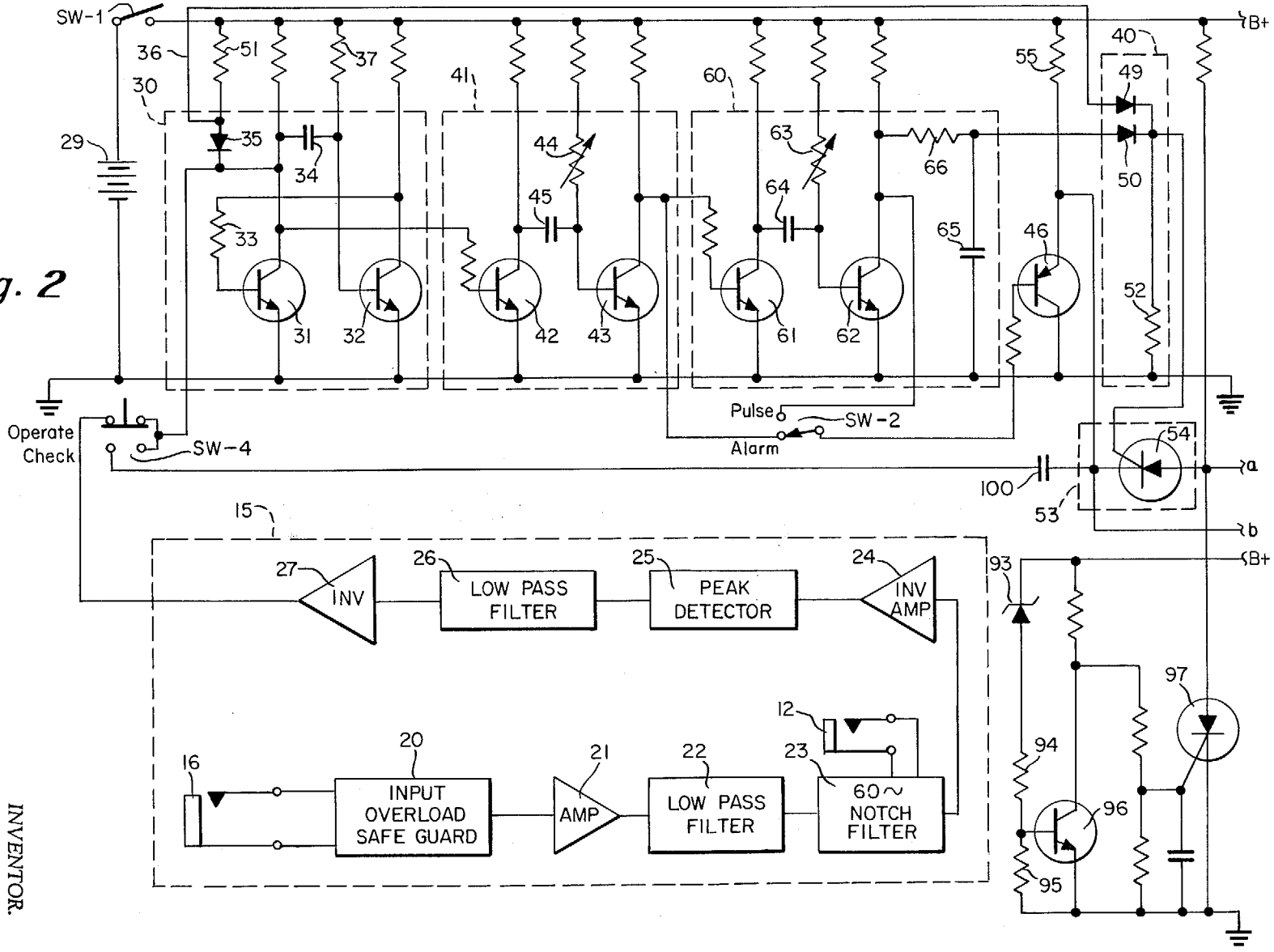
[ FIG. 2 is ]

With the above in mind, reference is made to FIG. 2 for a more detailed explanation of the invention.

The first mechanism to be described is the trigger mechanism. This is indicated generally in FIG. 2 by the dotted line 15. The function of this mechanism is to receive the EKG signal from the electrodes attached to the patient and to convert these signals into trigger pulses. While the trigger mechanism may take a variety of forms, the arrangement noted in block form within the dotted lines 15 has special advantages and is therefore preferred.

The input jack 16 is of conventional form and is adapted to be connected to the electrodes (not shown) which are placed on the patient in the usual manner. The electrodes are conventional preferably being EKONOTRODE brand. The first component in the trigger mechanism is an input overload safeguard 20 which in essence is a pair of diodes connected back to back, the purpose of which is to short out any high voltages which may be inadvertently or otherwise transferred into the jack. The signal from the overload 20 is fed to an amplifier 21 which amplifies the signal received from the patient. Connected to the output of the amplifier 21 is a low-pass filter 22. The purpose of this filter is to take out high-frequency signals due to patient muscle movement. In connection with the low-pass filter 22 the invention contemplates a 60-cycle notch filter 23 to remove any 60-cycle interference that may be present. The scope jack 12 is on the output of 60-cycle filter in order that the heart signal (minus the filtered out components) can be fed directly to an oscilloscope for observation. The output of the 60-cycle notch filter is then amplified by the amplifier 24 for further processing. The peak detector 25 and the low-pass filter 26 produce rectified and filtered positive pulses. These are then fed into an inverter 27, the output of which produces negatively going trigger pulses when fed through the switch S–4 to the input of a one-shot multivibrator indicated within the dotted lines 30.

In the explanation which follows it will be presumed that the switch SW–1 is in the "on" position and the mode switch SW–2 is in the alarm position and that the light switch SW–3 is also in the alarm position. The battery 29 is connected to the circuit as shown.

The one shot 30 is of conventional form comprising a pair of transistors 31 and 32 which are resistance-capacitance coupled as by the resistance 33 and the capacitor 34.

The function of the one shot 30 is to receive the trigger pulses and to develop an output signal ultimately used in the comparison process. The output of the one shot is a square wave, the total period or interval of which is made up of an "on" portion (a pulse) and an "off" portion. The period is the same as that of the trigger pulses. The "on" portion is started by a trigger pulse and is of fixed duration depending upon the time constant or the values of 37 and 34. The "off" portion remains off until the trigger pulse.

The output of the one shot is connected via the diode 35 and the line 36 to the gate mechanism within the dotted lines 40 and also connected to the input of a low-range delay mechanism within the dotted lines 41. The low delay 41 and the gate 40 will be explained following.

The low delay 41 is a conventional construction and comprises a transistor 42 which functions as an inverter and transistor 43 which has an RC circuit comprising the variable resistor 44 and the capacitor 45 coupled to the base of the transistor. With the switch SW–2 in the alarm position the output of the time delay mechanism 41 includes the emitter follower 46.

The function of the low mechanism 41 is to receive the signal from the one shot and develop an output signal which is used in the comparing process. The output signal of the low delay 41 is a square wave comprised of an "on" portion (a pulse) and an "off" portion. The total period or interval is the same as between trigger pulses. The low delay 41 is turned on at the time of the termination of the one shot pulse or "on" portion. The duration of the "on" portion is controlled by the adjustment of the resistor 44 as noted below. The "off" portion is a function of the period between trigger pulses since the pulse turns on the one shot and when the same finishes operating, the time delay is turned on again.

The RC circuit determines the nonconduction time of the transistor 43 and therefore controls the duration or the "on" time of the low delay 41. The resistor 44 is coupled to the knob 3 (FIG. 1) and the resistance value is changed by the rotation of the knob. When the knob 3 is rotated so that the arrow 5 is aligned with one of the numbers on the scale 4, the value of the resistor is such that the duration of the "on" portion corresponds to the heart rate setting on the scale.

From the above it will be apparent that the time relationship of the one-shot signal and the low delay signal is fixed in that the one shot is turned on by a trigger pulse and the low delay is turned on by the one shot. In other words, the one shot is turned on by a trigger pulse, has a fixed "on" portion and then goes off until the next trigger pulse. The low delay is turned on when the one shot goes off, has a settable "on" period and then goes off until turned on again by the one shot.

The gate mechanism 40 comprises a pair of input diodes 49 and 50 and output resistor 52. Diode 49 is connected to the one shot output. Either diode will conduct when an anode is positive with respect to the cathode. In the case of the low delay, the diode 49 is active and the output is a square wave, the same as the one shot square wave.

The output of the low delay 41 and the output of the gate 40 are connected to the comparing mechanism 53 which will compare the signals and sense whether the heart rate is below the rate set in by the arrow 5. This is explained by the following.

The comparing mechanism 53 is a silicon-controlled rectifier SCR 54. The SCR will conduct when the gate is positive and the cathode negative. Conduction is stopped by the cathode going positive. The signal from the gate 40 and the signal from the low delay 41 (via emitter follower 46) are respectively applied to the gate and the cathode to effect the conduction modes as noted below.

When the one shot 30 is "off" or on nonconducting the anode of the gate diode 49 is biased positively through the resistor 51. This causes the diode to conduct through resistor 52 and a positive voltage appears on the gate of the SCR 54. Inasmuch as the one shot is turned off, the time delay has been turned on and the emitter follower 46 does not conduct. This puts a positive voltage on the cathode of the SCR 54 so the SCR does not conduct.

Assuming a trigger pulse has not yet carried at the completion of the "on" condition of the low time delay, (nonconduction of the emitter follower), the time delay will go into the "off" condition and the emitter follower will commence conduction. This will make the cathode of the SCR negative and the same will conduct. The SCR will continue to conduct until the low time delay is turned to the "on" condition by the one shot.

The conduction of the SCR 54 of comparing mechanism 53 is adapted to provide for the actuation of the audible and/or visible signals. However, it is believed expedient to defer going into this until after the explanation of the workings of the high delay mechanism which is indicated in FIG. 1 within the dotted lines 60.

Before proceeding, it is pointed out that where the heart rate is over the rate limit setting on the low range, the trigger pulses appear with such rapidity that the low delay cannot complete its "on" portion before the next pulse appears. Under this condition the one-shot signal and the low delay signals are duplicates. Therefore, the polarities of the voltages on the SCR will not be correct to cause conduction. There will not be any audible or visible signal (up until the rate exceeds the setting on the high range). Within this rate period the high delay 60 (commented on below) has no effect in turning on the SCR 54.

The high delay mechanism 60 is constructed in the manner similar to the low delay mechanism 41. The high delay includes the transistor 61 which functions as an inverter together with the output transistor 62 to whose base is connected an RC circuit comprising the variable resistor 63 and the capacitor 64.

When the switch SW–2 is in pulse position the follower 40 is part of the high delay 60.

The output from the low delay is connected to the high delay and will cause the same to develop a square wave output. The duration of the "on" portion of the signal is determined by the setting of the resistor 63. The resistor 63 is connected to the knob 8 (FIG. 1) so that the output or conduction time of the transistor 62 is a function of the rate limit set in accordance with the scale 10. In the case of the high delay the diode 50 is active and functions in the same manner as the diode 49.

Since an audible or visible indication is desired when the heart rate exceeds the setting on the scale 10 (FIG. 1) the high delay is used to turn on the SCR 54 while the one shot signal is used to turn off the SCR 54. Actually, the low delay signal is used for turn off purposes since this signal is a duplicate of the one shot.

With reference to FIG. 1 it will be observed that when the high delay is "on" or nonconducting, a positive voltage is applied to the gate of SCR 54. At this time the low delay is "on" and a positive voltage is also applied to the cathode of the SCR. The SCR cannot conduct. The high and low delays go off together and this causes negative voltages on the gate and cathode of the SCR and the same cannot conduct. Therefore, I have included an additional delay in the output of the high delay in the form of a capacitor 65 and resistor 66. This had the effect of momentarily holding up the positive voltage on the gate. At this instant, of course, the cathode will be negative and therefore the SCR will have the proper polarity for conduction. The SCR will continue to conduct until the low delay stops conducting so that a positive voltage is applied to the cathode.

As mentioned heretofore, the invention is versatile in that it may adapted to fit the particular needs of a patient. For example, in FIG. 1 I have shown circuitry for adapting the unit with both the visible and audible signals to be observed by the patient. This is enclosed within the dotted lines 0-1.

Also, I have shown circuitry particularly useful for central station monitoring. This is shown within the dotted lines 0-2.

For purposes of explanation, let us assume that the arrangement within the dotted lines 0-1 is to be activated by the comparing mechanism.

When the SCR 54 conducts a negative bias is put on the base of the transistor 67 and since its emitter is positive, the transistor cannot conduct. The effect of this is to complete the circuit including the secondary coil of the isolation transformer T–1 and the primary coil of the speaker transformer T–2. The secondary coil of the transformer T–2 is connected to the speaker S–1. When the secondary coil of the transformer T–2 is energized, the speaker responds.

At the same time, conduction of the SCR 54 causes negative bias on the base of the transistor 68 and since its emitter is positive the transistor conducts. Conduction of the transistor 68 puts the positive supply voltage on the emitter of the transistor 69. This causes the emitter-to-base conduction in the transistor 69 down through the resistor 70 up through the primary coil 71 of the transformer T–1, down through the resistor 72, through the base and emitter of the transistor 73 to ground.

The above-described emitter-to-base conduction biases the transistors 69 and 73 so that they have collector conduction through the primary 71 of transformer T–1. The collector conduction increases until there is bias drop off on each transistor. The collector conduction causes a field across the primary coil 71 of the transformer T–1.

With the stopping of the collector conduction the field collapses and induces high voltage in the primary coil 71 of T–1 which is rectified by diode 75 and filtered by capacitor 76 to provide a DC potential for neon lamp 1. This also induces a voltage in the secondary coil of T–1. When current flows in the secondary circuit and the speaker S–1 is activated, audible tone is caused by the rapid energizing and collapsing of the field.

The arrangement comprising the transistor 69 and 73, the transformer T–1, the coupling resistors 70 and 72, together with the diode 75 connected in series with the parallel arranged neon lamp 1 and capacitor 76 is an important part of the invention. I have found that this arrangement is conducive of being able to drive both the speaker and the lamp with a very minimum of current. For example, in one embodiment with a battery voltage of 8.4 volts, both the lamp and speaker can be activated while drawing about 2.0 milliamperes.

The function of the circuit within the dotted lines 0—2 for remote central station operation will next be described.

The remote station circuit is connected across the battery conductors and to the SCR 54 as shown in FIG. 1. The speaker S–1 is out of the circuit and the speaker S–2 is connected into the circuit via the connection as shown as A and B. The jack 11 is connected to the remote station (not shown) via a plug to the patient's call system.

With the remote station arrangement, it is usually desirable to disable the speaker in the unit so that the noise of the same will not disturb the patient, but to leave the light operative to provide monitoring for a nurse in the patient's room. Thus, when the plug is connected to the jack 11, the connection between the terminals 76 and 77 is broken and this disconnects the speaker S–2. The signal produced by circuit is fed to the remote station via the terminals 77 and 78.

For remote station monitoring it is desirable to provide a delay between the time an alarm signal appears (conduction of the SCR 54) and the time a signal is fed to the remote station. The reason for the delay is to try to avoid spurious alarms. For example, if the unit is quiescent because the beat rate is between the low and the high range some spurious signal causing the conduction of SCR 54 will not provide an alarm at the remote station unless the circuit signal is repeated in a manner the same as a heart beat. The circuit provides for this delay as explained following.

When the SCR 54 of the comparing mechanism 53 is in the "off" condition, the resistor 80 will bias the transistor 81 so that it conducts. This will negatively bias the emitter 84 of the unijunction transistor 82 so that it will not fire.

When the SCR 54 conducts, the transistor 81 stops conducting and positive bias is supplied to the unijunction emitter through the resistor 83. The capacitor 86 however will not permit the bias to be applied immediately to the unijunction emitter 84. The charge time of the capacitor 86 is such that the SCR 54 will conduct several times before the capacitor will be charged enough so that full bias can be applied to the unijunction emitter 84. Preferably, this is made 5 conduction times or heart beats.

Thus, it will be apparent that for a single conduction condition of the SCR 54, this condition will not be translated to the remote station.

When the unijunction fires, this causes a spike voltage to be developed across the coils 90 and 91 of the transformer. The voltage biases the gate-cathode of the SCR 92 so that it can conduct. The SCR 92 continues to conduct until such time as the circuit at the remote station is opened, for example, by a nurse by turning a switch.

Another important feature of the invention is in the provision of means to provide battery fail safe. If the battery voltage drops below a certain level circuitry will be activated to cause the speaker to emit constant audible tone and the light to shine constantly.

The zener diode 93 and the resistors 94 and 95 bias the transistor 96 so that the same conducts. This puts a negative bias on the gate of the SCR 97 so that the same cannot conduct.

The diode 93 and the resistors 94 and 95 are chosen so that if the voltage from the battery (which is normally 8.4 volts) falls below 6.5 volts, the bias on the transistor 96 is removed to the extent that the same stops conducting. With the stopping of the conduction of transistor 96 the gate of the SCR 97 will be biased positively so that the SCR 97 conducts.

As will be apparent, the conduction of the SCR 97 has the same effect as the conduction of SCR 54. However, the SCR 97 is not cut off and hence the light and transformer will be on constantly. The speaker then gives a steady tone. Another important feature of the invention is that the accuracy of the low-rate delay setting and the high-rate setting can be checked using the circuitry itself. The manner in which this is done is explained following.

For checking, the switch SW–4 is moved to the check position and this is a spring-loaded return switch, the knob of the switch is held down. When the switch SW–4 is in the check position the trigger pulses from the mechanism 15 are disconnected from the input of one shot and in lieu hereof the switch connects the capacitor 100 with the input of the one shot. Thus, any of the square waves from the cathode follower 46 will be fed to the capacitor 100 which then will develop trigger pulses for each square wave pulse. The trigger pulses are fed to the input of the one shot and the one shot then will operate in the same manner as if it were energized by a patient trigger pulse. The remainder of the circuit will operate as previously described.

For calibration checking in the low range the switch SW–2 remains in the alarm position. For calibration checking in the high range the switch SW–2 is moved to the pulse position.

It will be observed that if switch SW–4 is actuated during the off-portion of the time delay mechanism (as connected by the switch SW–2) the negative signal present on the emitter of the follower 46 will be conducted through the capacitor 100 at the moment of the connection and turn on the one shot. If the moment of the connection of the switch SW–4 occurs during the on-portion of the time delay, the negative signal which appears on the follower 46 after completion of the on-portion will feed through the capacitor 100 and turn on the one shot. The one shot will continue to recycle upon completion of each delay period until the SW–4 switch is released.

The output rate of the emitter follower 46 will reflect the rate of the trigger pulses applied to the input of the one shot. Suppose, for example, that a patient is being monitored on the low range with the low-rate knob set on 40, the switch SW–4 is pushed in and a stop watch is used to see that the speaker beeps at the rate of about 40 beats per minute.

Another important feature of the invention is that the unit may be operated in a pulse mode. For this purpose, the switch SW–2 is actuated to the pulse position. With reference to FIG. 1 it will be seen that the switch SW–2 will connect the emitter follower 46 to the output of the high delay 60. Thus, it will be apparent, therefore, that the gate of the SCR is being fed by both the one shot signal and the delay signal through diode 50. The SCR 54 will simply be made to turn off and on as a function of the heart rate whether that rate is 30, 90 or any other value within the capacity of the instrument.

I claim:

1. For a cardiac monitor, audible-visible alarm means comprising:

first and second transistors, the emitters of which are adapted to receive a supply voltage transformer mechanism including primary coil means and secondary coil means, the ends of primary coil means being respectively connected to the collectors of said transistors;

a speaker connectable to the secondary coil means of said transformer mechanism;

a circuit including a diode in series with parallel-connected capacitor and neon light, the circuit being connected between the collectors of said transistors;

a first resistor connected to the base of the first transistor and to the collector of said second transistor; and second resistor connected to the base of the second transistor and to the collector of said first transistor.

2. In a cardiac monitor:

trigger mechanism to receive electrical signals developed as a function of the beat of the patient's heart and to convert the signals into trigger pulses there being a trigger pulse for each beat;

one shot mechanism connected to receive said trigger pulses and having means to develop pulses of first duration each latter pulse being initiated by a trigger pulse;

low delay mechanism connected to receive said one-shot pulses and having means actuated at the termination of each one-shot pulse to develop low delay pulses and the low delay mechanism including means to adjust the duration of each low delay pulse, said duration corresponding to a selected heart beat rate with a low range;

high delay mechanism connected to receive said one-shot pulses and being actuated at the termination of each one shot pulse to develop high delay pulses and the high delay mechanism including means to adjust the duration of each high delay pulse, said duration corresponding to a selected heart beat rate with a high range;

comparing means connected to operate alternatively as follows:

a. to receive said one shot pulses and said low delay pulses and to compare the interval between the end of the low delay pulse and the start of the next one shot pulse and develop an output signal as a function of said interval; or b. to receive said one shot pulses and said high delay pulses and develop an output signal which is initiated when the start of a one shot pulse occurs before the termination of a high delay pulse;

monitor mechanism including audio and/or visible means and having connections with said comparing means to receive its output signal and activate the audible and/or visible means when the heart beat rate is within the low range and when the heart beat rate is within the high range; and switch means to disconnect the trigger mechanism and the input of one shot mechanism and to connect, alternatively, the output of the low delay mechanism or the output of the high delay mechanism with the input of the one shot mechanism, the switches providing for the use of the one shot, the low delay and the high delay to check the calibration of said low delay and said high delay adjusting means.

3. In a cardiac monitor:

trigger mechanism to receive electrical signals developed as a function of the beat of a patient's heart and to convert the signals into trigger pulses there being a trigger pulse for each beat;

one-shot mechanism connected to receive said trigger pulses and having means to develop pulses of fixed duration, each latter pulse being initiated by a trigger pulse;

low delay mechanism connected to receive said one shot pulses and having means actuated at the termination of each one shot pulse to develop low delay pulses and the low delay mechanism including means to adjust the duration of each low delay pulse, said duration corresponding to a selected heart beat rate within a low range;

high delay mechanism connected to receive said one shot pulses and being actuated at the termination of each one shot pulse to develop high delay pulses and the high delay mechanism including means to adjust the duration of each high delay pulse, said duration corresponding to a selected heart beat rate within a high range;

comparing means connected to operate alternatively as follows:

a. to receive said one shot pulses and said low delay pulses and to compare the interval between the end of a low delay pulse and the start of the next one shot pulse and develop an output signal as a function of said interval; or b. to receive said one shot pulses and said high delay pulses and develop an output signal which is initiated when the start of a one shot pulse occurs before the termination of a high delay pulse;

monitor mechanism including audio and/or visible means and having connections with the output of said comparing means to receive its output signal and activate the audible and/or visible means when the heart beat rate is within the low range and when the heart beat rate is within the high range; and said connections between the comparing means and the monitor mechanism including means operative upon receipt of the initial output signal of the comparing means to prevent the comparing means output signals from reaching the monitor mechanism for a predetermined amount of time whereby to mask out the effects of false trigger signals.

*4. In a cardiac monitor:*

*trigger means for receiving electrical signals developed as a function of the beat of a human heart and to convert the signals into trigger pulses, there being a trigger pulse for each detected heartbeat,*

*timing detection means connected for successive actuation by said trigger pulses and including means for effectively measuring the time interval between successive trigger pulses up to a predetermined time interval and for producing an output signal indicative of the rate of said trigger pulses and hence of said human heartbeat,*

*output means connected to receive said output signal and to produce a corresponding humanly sensible output indication of said human heartbeat, and*

*testing means for applying said output signal to the timing means in place of said trigger pulses whereby said timing means produces said output signal at a frequency corresponding to said predetermined period thus permitting the calibration of said predetermined time interval to be checked by observing said humanly sensible output.*

* * * * *